United States Patent
Blomberg et al.

(10) Patent No.: US 9,183,525 B2
(45) Date of Patent: Nov. 10, 2015

(54) METHOD AND SYSTEM FOR IDENTIFYING AND VISUALIZING WORK TRANSFERS USING FINANCIAL DATA

(71) Applicant: INTERNATIONAL BUSINESS MACHINES CORPORATION, Armonk, NY (US)

(72) Inventors: Jeanette L Blomberg, Portola Valley, CA (US); Neil H. A. Boyette, Oregon City, OR (US); Anca A Chandra, Los Gatos, CA (US); Sechan Oh, Stanford, CA (US); H Raymond Strong, Jr., San Jose, CA (US)

(73) Assignee: GLOBALFOUNDRIES, INC., Grand Cayman (KY)

( * ) Notice: Subject to any disclaimer, the term of this patent is extended or adjusted under 35 U.S.C. 154(b) by 132 days.

(21) Appl. No.: 14/036,070

(22) Filed: Sep. 25, 2013

(65) Prior Publication Data

US 2015/0088591 A1     Mar. 26, 2015

(51) Int. Cl.
*G06Q 10/06* (2012.01)

(52) U.S. Cl.
CPC ................................. *G06Q 10/0633* (2013.01)

(58) Field of Classification Search
CPC .............. G06Q 10/06; G06Q 10/0633; G06Q 10/06316; G06Q 10/063; G06Q 10/10
See application file for complete search history.

(56) References Cited

U.S. PATENT DOCUMENTS

| 7,937,277 | B2 | 5/2011 | Marx |
| 2003/0004848 | A1 | 1/2003 | Hellerstein et al. |
| 2004/0220947 | A1 | 11/2004 | Aman et al. |
| 2007/0055558 | A1 | 3/2007 | Shanahan et al. |
| 2010/0042745 | A1 | 2/2010 | Maeda et al. |

FOREIGN PATENT DOCUMENTS

| EP | 955746 A2 | 11/1999 |
| WO | 2009102906 A1 | 8/2009 |

OTHER PUBLICATIONS

El-Gendy et al., Statistical Characterization for Per-hop QoS, Proc. of the 11th IWQoS, 2003, 2707, pp. 21-40.
Mao et al., Reducing the Transfer Time for Large Files in High Performance Networks, 2003, 9 pgs.
Sun et al., Incremental Workflow Mining with Optional Patterns and Its Application to Production Printing Process, Int'l Journal of Intelligent Control and Systems, Mar. 2007, 12(1), pp. 45-55.
Agrawal et al., Mining Process Models from Work-Flow Logs, Proc. of the 6th EDBT, 1998, 1377, pp. 467-483.

(Continued)

*Primary Examiner* — Farley Abad
(74) *Attorney, Agent, or Firm* — Matthew M. Hulihan, Esq.; Heslin Rothenberg Farley & Mesiti P.C.

(57) ABSTRACT

Disclosed are methods and systems for identifying and visualizing the patterns of work transfers for service delivery using financial data. Within a service firm, work is often transferred from one delivery center to another, which results in additional costs and delays in service delivery. To control unnecessary work transfers, sustained patterns of work transfer are identified so that steps can be taken to limit their occurrence. The disclosed methods and systems analyze the relations among the costs transferred from one location to another.

15 Claims, 3 Drawing Sheets

(56) References Cited

OTHER PUBLICATIONS

Greco et al., Mining Expressive Process Models by Clustering Workflow Traces, Proc. of the 8th PAKDD, 2004, 3056, pp. 52-62.
Herbst et al., Workflow Mining with InWoLvE, Computers in Industry, Apr. 2004, 53(3), pp. 245-264.
Van Der Aalst et al., Process Mining: A Research Agenda, Computers in Industry, Apr. 2004, 53(3), pp. 231-244.
Silva et al., Probabilistic Workflow Mining, Proc. of the 11th ACM SIGKDD, 2005, pp. 275-284.

METHOD AND SYSTEM FOR IDENTIFYING AND VISUALIZING WORK TRANSFERS USING FINANCIAL DATA

BACKGROUND OF THE INVENTION

1. Field of Invention

The present invention relates generally to the field of multi-hop work transfers. More specifically, the present invention is related to identifying and visualizing work transfers using financial data.

2. Discussion of Related Art

One of the most important advantages that global enterprises have compared to local firms is that they can more easily obtain skills in a wider range of geographical locations. For example, IT firms can provide certain services to their clients in one country by using employees located in another country where skilled IT workers are available. Global firms benefit from the ability to allocate work to the location best able to do the work based on available skills and billing rates, as well as factors like proximity to client, governmental policies, and languages spoken.

In global enterprises, transferring work from one location to another is common, and such transfers often occur on an ad-hoc basis. For example, when a global service firm develops a plan for service delivery for its client, the firm determines which delivery center to use for certain services based on information about the skills available in each delivery center. However, the information about available skills in each delivery center may change over time requiring that adjustments be made, including moving the work to another delivery center. Thus, when a delivery center receives a work request for a certain service from another location, the delivery center may not possess the required skills to perform the work, and thus needs to transfer the work to another delivery center. Such work transfers may also occur in multiple steps because information about skills availability may not be accurate when the transfer is made or because availability levels may change over time.

Work transfers may occur repeatedly if the firm is unable to identify recurring patterns in the transfer of work. Unnecessary work transfers incur transactional costs for the firm, including the time needed for workers in the new delivery center to gain knowledge of the client's IT and business context. In addition to financial costs, the churn has an impact on client satisfaction and service quality, which can be affected by service delays and disruptions in service delivery.

SUMMARY OF THE INVENTION

In this invention, methods and systems for identifying and visualizing the patterns of work transfer in a network of geographically distributed work locations are described. Financial data are used to associate contracts where work is performed. Financial (ledger) data provide a record of service cost transfers in and out of each geography, but often the direct relationship is not specified between transfers-in and transfers-out (such direct specification would take the following form: 10% of transfers from country A to country B is further transferred to country C). When direct information of pass-through is not available, the flow of work is identified by analyzing the correlation between transfer-in from one geographical region and transfer-out to another geographical region with consideration for potential time-delays. By identifying the patterns of workflow in every location, a flow diagram of the work transfers is built. Identifying and visualizing sustained work transfer patterns provides a way for the firm to control unnecessary work transfers. The existing literature on the flow of work does not discuss the use of financial data for analyzing work transfers.

The prior art solves the problem of identifying the workflows in business processes by mining data. However, unlike the present invention, the methods proposed in the prior art elicit workflow information from workflow logs that contain detailed traces of each work step. In the present invention, the information about work transfers is often only available at the aggregate level, and thus tracing the entire trajectory of a single piece of work is impossible with given data. Furthermore, the processes studied in the prior art, such as an automobile assembly process, always begin at initiating nodes and end at terminal nodes, as opposed to the situation in which every node can initiate, complete, or transfer work.

Embodiments of the present invention are an improvement over prior art systems and methods.

In one embodiment, the present invention provides a method for discovering and reducing multi-hop work transfers from accounting information, comprising: representing a time series of aggregate amounts of reported transfers between each pair of locations, each aggregate amount corresponding to a given location pair and representing an aggregate amount of work transferred from one location to another location of the given location pair during a given time period; performing a regression analysis on first and second aggregate amounts for corresponding time periods where the receiving location of the first amount and the sending location of the second amount are the same; indicating the presence of a multi-hop transfer when the regression analysis passes a significance test; and measuring the multi-hop transfer by the regression analysis.

In one embodiment, the present invention also provides a method for identifying and visualizing work transfers originating at location A and transferred to location C via location B, the method comprising: identifying, from financial data, $c(A, B, t)$ and $c(B, C, t)$ for every time period t of interest, where $c(A, B, t)$ represents amount of work transferred from A to B during the time period t and $c(B, C, t)$ represents amount of work transferred from B to C during the time period t; conducting a regression test on $c(A, B, t)$ and $c(B, C, t)$ and identifying a regression coefficient; identifying repeated work transfer from location A to location C via location B when the regression coefficient exceeds a pre-determined threshold; and graphically representing the identified repeated work transfer from location A to location C via location B.

In one embodiment, the present invention also provides a method for identifying and visualizing work transfers originating at location A and transferred to location C via location B with a time delay, the method comprising: identifying, from financial data, $c(A, B, t)$ and $c(B, C, t+\Delta)$, where location B receives work from location A at time t and transfers the work to location C at time $t+\Delta$, where $c(A, B, t)$ and $c(B, C, t+\Delta)$ represent amounts of work transferred from A to B and from B to C, respectively; conducting a regression test on $c(A, B, t)$ and $c(B, C, t+\Delta)$ for a range of values of $\Delta$ and identifying the largest regression coefficient; identifying repeated work transfers from location A to location C via location B when the largest regression coefficient exceeds a pre-determined threshold; and graphically representing the identified repeated work transfer from location A to location C via location B with a time delay of $\Delta$.

In one embodiment, the present invention provides an article of manufacture having a non-transitory computer usable medium having computer usable program code for identifying and visualizing work transfers originating at location A and transferred to location C via location B, wherein the non-transitory computer usable medium comprises: computer readable program code identifying, from financial data, c(A, B, t) and c(B, C, t) for every time period t of interest, where c(A, B, t) represents amount of work transferred from A to B during said time period t and c(B, C, t) represents amount of work transferred from B to C during said time period t; computer readable program code conducting a regression test on c(A, B, t) and c(B, C, t) and identifying a regression coefficient; computer readable program code identifying repeated work transfer from location A to location C via location B when said regression coefficient exceeds a pre-determined threshold; and computer readable program code graphically representing said identified repeated work transfer from location A to location C via location B.

BRIEF DESCRIPTION OF THE DRAWINGS

The present disclosure, in accordance with one or more various examples, is described in detail with reference to the following figures. The drawings are provided for purposes of illustration only and merely depict examples of the disclosure. These drawings are provided to facilitate the reader's understanding of the disclosure and should not be considered limiting of the breadth, scope, or applicability of the disclosure.

DESCRIPTION OF THE PREFERRED EMBODIMENTS

Figure 1:
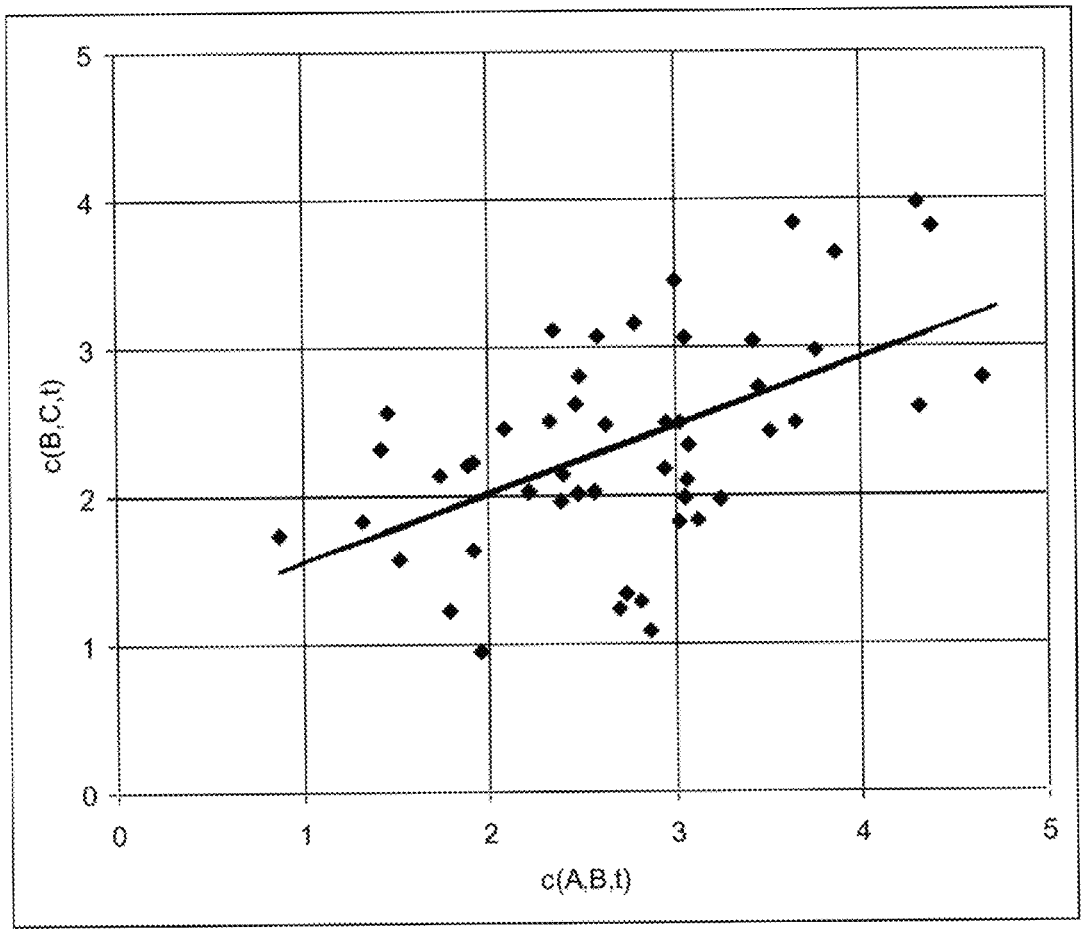
FIG. 1 depicts an example of the scatter plot for the data where each point in the plot represents the values of c(A, B, t) and c(B, C, t) for a given t.

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein.

The present invention discloses a global service provider which provides various services to its clients using multiple globally distributed delivery centers. When the service provider makes a supply agreement with the client, the service provider starts by developing a delivery plan. The plan includes when and which delivery center provides a certain service to the client firm. The decision of which delivery center provides a certain service depends on several factors such as billing rates, proximity to the client, and the available skills at each delivery center.

Due to the large number of globally distributed delivery centers and the variety of skills required to deliver the services, the team that develops the delivery plan often has inaccurate information about the availability of skills at each delivery center. As a result, after the planning phase, the delivery center may receive work requests that cannot be processed due to the absence of required skills. In such cases, the delivery center that received the work request transfers the request to another location that may be able to execute the work. Transferred work requests may be transferred further to another location, if the receiving location also lacks the required skills or does not have the capacity for processing the work.

Due to the large volume of work transfer across different geographies, the entire history of transfers is often not available at the operational level. Instead, each location claims the total cost that it incurred for the work requests that were received from another location. Table 1, below, is an example of ledger entries showing the costs charged by other locations to a specific location.

TABLE 1

| Cost Description | USD Amount | Year | Month |
|---|---|---|---|
| Cost from location A | 100 | 2010 | 2 |
| Cost from location B | 300 | 2010 | 2 |
| Cost from location C | 50 | 2010 | 3 |

Sometimes, the sources of transferred work requests (costs) can be directly identified by the associated contracts to which the transferred costs are allocated. When the sources of transferred work are not given, the present invention can identify how much work that is received by location A from location B, is further transferred to location C. The method consists of conducting a regression analysis between transfers-out from B to C and the transfers-in from A to B. Before doing so, the transferred costs whose sources are known are removed.

3.1. Regression Analysis

As discussed above, some of the work requests transferred to a location can be further transferred to other locations, and how such multi-hop transfer information is not available in many cases. Discussed below are the ways to establish the relationship between work transfers to a specific location and work transfers from the location.

Suppose that location B receives work requests from location A, and transfers work requests to location C. The work requests that location B transfers to location C include some of the work requests that location B received from location A, and also the work that location B generates by itself c(A, B, t) is defined as the amount of total work (in terms of cost transfers in the ledger) transferred from A to B during period t, excluding all work that was further transferred to known locations. k(A, B, C, t) is defined as the amount of known work transfers from A to B to C during period t. To identify work transfers from A to C via B, c(A, B, t) and c(B, C, t) are collected from the ledger for every period t of the interest.

FIG. 1 depicts an example of the scatter plot for the data. Each point in the plot represents the values of c(A, B, t) and c(B, C, t) for a given t. If location B transfers the work requests that it received from A to location C repeatedly, then there should be a positive correlation between c(A, B, t) and c(B, C, t). Thus, such repeated work transfers are identified by conducting a regression test such as a linear regression test on c(A, B, t) and c(B, C, t). The linear line in the above graph is the linear line best fitting the scatter plot.

When the regression coefficient ($R^2$) exceeds a certain threshold, it is concluded that some of the work requests that location A transfers to location B are further transferred to location C repeatedly. The volume of these multi-hop transfers is estimated from the slope of the linear regression line. Suppose that the linear regression line has the following values: c(B, C, t)=ac(A, B, t)+β. This result suggests that ax 100% of the work requests transferred from A to B with unknown next destination information are further transferred to C. Then, wt(A, B, C) is defined as follows $$wt(A, B, C) = \frac{[\alpha \text{ Mean}(c(A, B, t)) + \text{Mean}(k(A, B, C, t))]}{[\text{Mean}(c(A, B, t)) + \text{Mean}(k(A, B, C, t))]} \times 100\%,$$

which indicates the average percentage of work requests transferred from B to C among the work requests transferred from A to B. Note that, when computing wt(A, B, C), the present invention takes the known transfers from A to B to C, i.e., k(A, B, C, t), into account.

It should be noted that work transfers may occur with a certain time delay. For example, location B may receive a request from location A at period t, but further transfer the work to location C at period t+1. When most work transfers occur with such a time-delay, multi-hop work transfers can be identified by analyzing the correlation between transfers with a certain time gap. For example, a regression test can be conducted on c(A, B, t) and c(B, C, t+Δ) for various values of Δ, where the value of Δ with the largest regression coefficient is taken.

In some cases, the order in which related transfers are recorded can be reversed from the causal order. The time difference may be randomly −1, 0, or 1 period. Since these time differences are not systematic, linear regression tests for time adjusted time series cannot be performed. In such cases, linear regression tests may be performed for the three-period simple moving averages of the relevant pairs of time series.

3.2. Generating Workflow Diagram

Next, a discussion is provided on how to generate the diagram of the flows of work generated by a location. The location of interest is denoted by location A and the average amount of work that A generates and transfers to location X is denoted by wo(A, X). The set of locations that receive work from A is denoted by L(A). Then, the following are defined
  TA={•}: the set of distinct directional location pairs to analyze, and
  TD={•}: the set of distinct analyzed directional location pairs The elements to be added to these two sets are the pairs of two locations with direction, e.g., A→B. WT is defined as follows:
  WT={•}: the set of identified work transfers.

The elements to be added to this set are the triples wt(A, B, C) defined in the previous subsection. Finally, WO is defined below:
  WO={•}: the original work that location A generated and transferred to other locations.

All these sets are initially constructed as empty sets. In order to generate the workflow diagram, the two sets WO and WT need to be filled. To do so, the following algorithm is run
  For every X in L(A)
    Add A→X to TA
    Add wo(A, X) to WO
  While TA is not empty
    Take an element Y→X from TA
    Get L(X), which is the set of locations that receive work from X
    For every Z in L(X)
      Determine whether c(Y, X, t) and c(X, Zt) pass the correlation test
      If so, compute wt(Y, X, Z), and add it to WT
      If in addition X→Z is in neither TD nor TA, add X→Z to TA
    Add Y→X to TD, and remove it from TA Starting from the original location, the algorithm looks for all locations that receive work from the location, and determines whether the recipient location further transfers the work to other locations. The algorithm continues to search multi-hop transfers until all potential work transfers are identified.

Figure 2:
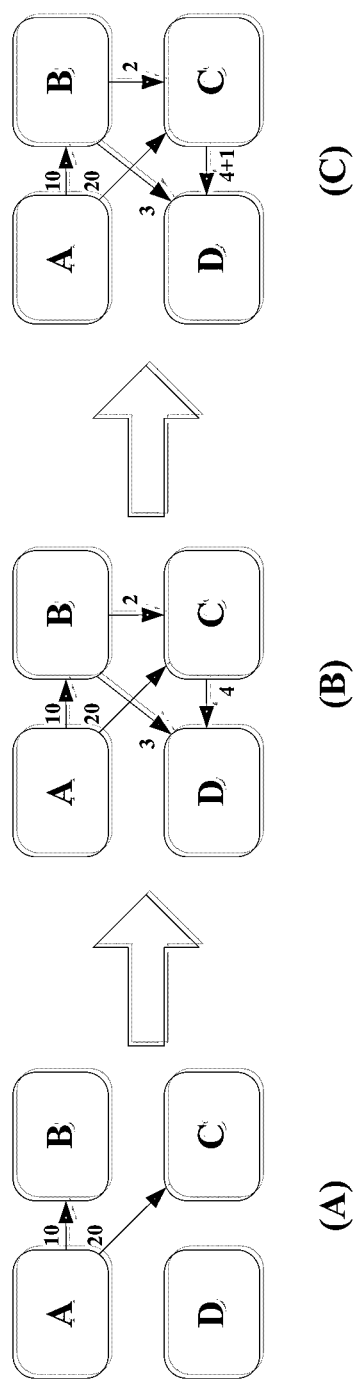
FIG. 2A-C depicts a graphical example to facilitate understanding the invention based on an analysis of work transfer units between locations A, B, and C.

With the two sets WO and WT constructed by the above method, a discussion is presented on how to construct the diagram of work flows. The objective is to quantify the flows of work originally generated by location A. f(X, Y) is defined as the amount of work originally generated by location A, and later received by location X and further transferred to location Y. This value is different from wo(X, Y), which indicates the work that location X generates and transfers to location Y. The amount of work measured by f(X, Y) originated from location A. An objective is to determine the values of f(X, Y) for all location pairs. To do so, a set is defined and an initialization step is run:
  Q={•} as the temporary set of work transfers to examine
  Set f(X, Y)=0 for every X and Y in the network.
  For every wo(A, X) in WO:
    Update f(A, X) as wo(A, X)
    Add wo(A, X) to Q The elements in Q will be examined to see whether they are further transferred to other locations. Then, the following algorithm identifies all traces of work generated from location A
  While Q is not empty
    Get an element q(X, Y) from Q
    For every Z such that wt(X, Y, Z) is in WT
      Update f(Y, Z) as f(Y, Z)+f(X, Y)*wt(X, Y, Z)
      Check if q(Y, Z) is in Q
        If not, add q(Y, Z)=q, Y)*wt(X, Y, Z) to Q
        If so, update q(Y, Z) as q(Y, Z)+q, Y)*wt, Y, Z) in Q
    Remove q(X, Y) from Q FIG. 2A-C depicts a graphical example to facilitate understanding the invention. Suppose that location A generates and transfers 10 units of work to location B and 20 units of work to location C, i.e., WO={wo(A, B)=10, wo(A, C)=20}. Suppose also that identified work transfers are given as follows: WT={wt(A, B, C)=20%, wt(A, B, D)=30%, wt(B, C, D)=50%, wt(A, C, D)=20%}.

The graph in FIG. 2(A) shows that location A generates and transfers 10 units of work to location B, and generates and transfers 20 units of work to location C. Because this work can be transferred to other locations, it is added to the set Q for further investigation. The correlation analysis shows that location B transfers 20% of work it receives from location A to location C and 30% of them to location D. Thus, f(B, C) incremented by 2 units and f(B, D) is incremented by 3 units. Because these two work transfers can be further transferred, it is added to the set Q. Because the work q(A, B)=10 is analyzed, it is removed from Q. Similarly, the work that location A transferred to location C is also analyzed as shown in the graph depicted in FIG. 2(B). At this step the set Q contains three elements: q(B, C)=2, q(B, D)=3, and q(C, D)=4. The correlation analysis implies that 50% of the work that location B transfers to location C is further transferred to location D. Thus, the algorithm adds one unit of work from location C to location D. The correlation analysis shows that location D does not transfer any work that it receives from location B or location C. Thus, the algorithm stops, and the full diagram is constructed as in the third graph depicted in FIG. 2(C).

3.3. Computing Optimal Work Transfers

If the service provider knew which work was processed at each location upfront, locations would not need to transfer the work that they received from other locations. Considering the transactional costs and potential time-delays incurred by such multi-hop work transfers, the firm's optimal work transfer decision is to always transfer work to a location that can process it directly. Thus, the optimal work transfer decision is obtained as follows.

Figure 3:
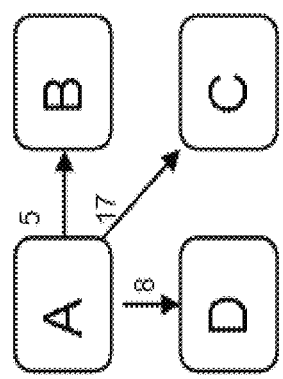
FIG. 3 depicts an example of the optimal work transfer decision.
Figure 3:
Figure 3:
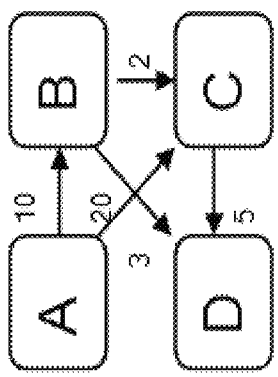

For every location X!=A, compute
TI(X): sum of f(Y, X) for every Y
TO(X): sum of f(X, Y) for every Y
TI(X)−TO(X): net work done by location X
Direct TI(X)−TO(X) from location A to location X FIG. 3 depicts an example of the optimal work transfer decision.

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor. By way of example, and not limitation, such non-transitory computer-readable media can include flash memory, RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. The computer readable media does not include carrier waves and electronic signals passing wirelessly or over wired connections.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable BluRay® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As noted above, particular embodiments of the subject matter have been described, but other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results.

CONCLUSION

Systems and methods have been shown in the above embodiments for identifying and visualizing work transfers using financial data. While various preferred embodiments have been shown and described, it will be understood that there is no intent to limit the invention by such disclosure, but rather, it is intended to cover all modifications falling within the spirit and scope of the invention, as defined in the appended claims. For example, the present invention should not be limited by software/program, computing environment, or specific computing hardware.

The invention claimed is:

1. A computer-based method for discovering and reducing multi-hop work transfers from accounting information, comprising:
representing a time series of aggregate amounts of reported work transfers between each directional pair of locations, each aggregate amount corresponding to a given directional location pair and representing an aggregate amount of work transferred between said given directional location pair during a given time period;
performing a regression analysis on first and second aggregate amounts for corresponding time periods where the receiving location of the first amount and the sending location of the second amount are the same;
indicating the presence of a multi-hop transfer when said regression analysis passes a significance test;
measuring the multi-hop transfer by said regression analysis; and
optimizing work flow by directing net work to its ultimate target in one hop when said multi-hop transfer is indicated.

2. The method of claim 1, wherein said regression analysis is a linear regression test.

3. The method of claim 2, further comprising performing said linear regression test on a three-period simple moving average.

4. The method of claim 1, further comprising the step of subtracting transfers that are allocated to contracts from the aggregate amounts of the reported transfers.

5. The method of claim 1, further comprising completing and visualizing a table of measured multi-hop transfers from one place by a transitive closure operation in a graph with nodes as places and edges as parts of measured multi-hop transfers.

6. A computer-based method for identifying and visualizing work transfers originating at location A and transferred to location C via location B, said method comprising:
identifying, from financial data, $c(A, B, t)$ and $c(B, C, t)$ for every time period t of interest, where $c(A, B, t)$ represents amount of work transferred from A to B during said time period t and $c(B, C, t)$ represents amount of work transferred from B to C during said time period t;
conducting a regression test on $c(A, B, t)$ and $c(B, C, t)$ and identifying a regression coefficient;
identifying repeated work transfer from location A to location C via location B when said regression coefficient exceeds a pre-determined threshold;
graphically representing said identified repeated work transfer from location A to location C via location B; and
optimizing repeated work transfer from location A to location C via location B by directing net work directly from location A to location C in one hop.

7. The method of claim 6, wherein said financial data are ledger data.

8. The method of claim 6, wherein said regression test is a linear regression test.

9. The method of claim 6, wherein said method comprises:
generating a scatter plot of $c(B, C, t)$ versus $c(A, B, t)$;
identifying a linear regression line best fitting said scatter plot;
identifying a slope of said linear regression line; and
identifying said repeated work transfer from location A to location C via location B based on said regression coefficient.

10. The method of claim 6, wherein said method comprises:
generating a scatter plot of c(B, C, t) versus c(A, B, t);
identifying a linear regression line best fitting said scatter plot;
identifying a slope, α, of said linear regression line;
computing an average percentage of work requests transferred from B to C among the work requests transferred from A to B as follows:

$$wt(A, B, C) = \frac{[\alpha \text{ Mean}(c(A, B, t)) + \text{Mean}(k(A, B, C, t))]}{[\text{Mean}(c(A, B, t)) + \text{Mean}(k(A, B, C, t))]} \times 100\%,$$

where k(A, B, C, t) represents known transfers from A to B to C; and
identifying said repeated work transfer from location A to location C via location B based on said computed average percentage of work requests transferred from B to C among the work requests transferred from A to B.

11. The method of claim 10, wherein said financial data are ledger data.

12. A computer-based method for identifying and visualizing work transfers originating at location A and transferred to location C via location B with time delay, said method comprising:
identifying, from financial data, c(A, B, t) and c(B, C, t+Δ), where location B receives work from location A at time t and transfers the work to location C at time t+Δ, where c(A, B, t) and c(B, C, t+Δ) represent amounts of work transferred from A to B and from B to C, respectively;
conducting a regression test on c(A, B, t) and c(B, C, t+Δ) for a range of values of Δ and identifying the largest regression coefficient;
identifying repeated work transfer from location A to location C via location B with time-delay when said largest regression coefficient exceeds a pre-determined threshold;
graphically representing said identified repeated work transfer from location A to location C via location B; and
optimizing repeated work transfer from location A to location C via location B by directing net work directly from location A to location C in one hop.

13. The method of claim 12, wherein said regression test is a linear regression test.

14. The method of claim 13, wherein said linear regression test is performed on a three-period simple moving average.

15. An article of manufacture having a non-transitory computer usable medium having computer usable program code for identifying and visualizing work transfers originating at location A and transferred to location C via location B, said non-transitory computer usable medium comprising:
computer readable program code identifying, from financial data, c(A, B, t) and c(B, C, t) for every time period t of interest, where c(A, B, t) represents amount of work transferred from A to B during said time period t and c(B, C, t) represents amount of work transferred from B to C during said time period t;
computer readable program code conducting a regression test on c(A, B, t) and c(B, C, t) and identifying a regression coefficient;
computer readable program code identifying repeated work transfer from location A to location C via location B when said regression coefficient exceeds a pre-determined threshold;
computer readable program code graphically representing said identified repeated work transfer from location A to location C via location B; and
computer readable program code optimizing repeated work transfer from location A to location C via location B by directing net work directly from location A to location C in one hop.

* * * * *